(12) United States Patent
Morariu et al.

(10) Patent No.: US 10,999,122 B2
(45) Date of Patent: May 4, 2021

(54) IDENTIFICATION OF COMPUTER PERFORMANCE ANOMALIES WITH A LOGICAL KEY PERFORMANCE INDICATOR NETWORK

(71) Applicant: Oracle International Corporation, Redwood City, CA (US)

(72) Inventors: Octavian Gheorghe Morariu, Cluj Napoca (RO); Fa Wang, Palo Alto, CA (US); Raymond Michael Ofiaza Ordona, Hayward, CA (US); Xintao He, Beijing (CN); Mei Yuan, Foster City, CA (US); Victor Campbell Webb, Wellesley, MA (US)

(73) Assignee: Oracle International Corporation, Redwood City, CA (US)

( * ) Notice: Subject to any disclaimer, the term of this patent is extended or adjusted under 35 U.S.C. 154(b) by 297 days.

(21) Appl. No.: 16/116,324

(22) Filed: Aug. 29, 2018

(65) Prior Publication Data
US 2020/0076675 A1   Mar. 5, 2020

(51) Int. Cl.
H04L 12/24    (2006.01)

(52) U.S. Cl.
CPC ...... H04L 41/0631 (2013.01); H04L 41/5009 (2013.01)

(58) Field of Classification Search
CPC ............ H04L 41/0618; H04L 41/0631; H04L 41/5009
See application file for complete search history.

(56) References Cited

U.S. PATENT DOCUMENTS

| | | | |
|---|---|---|---|
| 2005/0216831 A1* | 9/2005 | Guzik | G06Q 40/00 715/255 |
| 2016/0105330 A1* | 4/2016 | Choudhary | H04L 67/10 715/736 |
| 2018/0024875 A1* | 1/2018 | Della Corte | G06F 11/079 714/37 |

OTHER PUBLICATIONS

Anomaly Detection: Numenta Anomaly Benchmark, downloaded on Sep. 13, 2018 from https://numenta.com/numenta-anomaly-benchmark/, 2015, 7 pages.
Lavin et al., "Evaluating Real-time Anomaly Detection Algorighms, the Numenta Anomaly Benchmark," Oct. 9, 2015, 8 pages.
(Continued)

*Primary Examiner* — Omar J Ghowrwal
*Assistant Examiner* — Natali Pascual Peguero

(57) ABSTRACT

In an exemplary embodiment, a computer system hosts a logical Key Performance Indicator (KPI) network to detect computer performance anomalies. Databases execute database KPI nodes, database edges, and database instance nodes of the logical KPI network to propagate database KPI data to a KPI server system. Application servers execute application server KPI nodes, application server edges, and application server instance nodes of the logical KPI network to propagate application server KPI data to the KPI server system. Web servers execute web server KPI nodes, web server edges, and web server instance nodes of the logical KPI network to propagate web server KPI data to the KPI server system. This KPI data indicates logical data path information for the propagated KPI data (instead of KPI values). The KPI server system processes the logical data path information to indicate the computer performance anomalies.

20 Claims, 7 Drawing Sheets

(56) References Cited

OTHER PUBLICATIONS

Shipmon et al., "Time Series Anomaly Detection—Detection of Anomalous Drops with Limited Features and Sparse Examples in Noisy Highly Periodic Data," Google Inc., 2017, 9 pages.
Splunk Video Portal, Video for "Machine Learning and Anomaly Detection", https://www.splunk.com/en_us/resources/video.BreDVkNTE6oOX5PZPCfGjyCEcPz_AhW2.html, 2017, 5 pages.
Netflix Technology Blog, "RAD-Outlier Detection on Big Data," downloaded from https://www.splunk.com/en_us/resources/video.BreDVkNTE6oOX5PZPCfGjyCEcPz_AhW2.html, Feb. 19, 2015, 6 pages.

* cited by examiner

IDENTIFICATION OF COMPUTER PERFORMANCE ANOMALIES WITH A LOGICAL KEY PERFORMANCE INDICATOR NETWORK

TECHNICAL BACKGROUND

A large cloud computing network features numerous data centers around the globe that each have several computers. These data centers host web sites, sales applications, media content, financial databases, customer records, and the like. The data centers serve users like hospitals, schools, media networks, government agencies, and web businesses. The management of such large and complex cloud computing networks is a significant challenge. Within a physical data center, each user has their own logical databases and logical servers that share the physical data center hardware. The logical databases and logical servers are software applications that are stored and executed within the physical data center hardware. In large cloud networks, there may be millions of these logical databases and servers (or more) to manage across thousands of computers (or more).

Computer analysts often study computer performance computer Key Performance Indicators (KPIs) to manage cloud computing networks. The computers that comprise the cloud generate computer KPIs as a part of their normal operation. The computer KPIs are human-readable statements that indicate the current status of their circuitry, operating systems, databases, and applications. Typical computer KPIs may comprise "CPU X24 USAGE=84%" or "MEMORY A4 LATENCY=0.04 ms." In large cloud computing networks, the numerous computers produce a massive amount of KPIs every second.

Data network operators use computer KPIs to service their users. For example, a computer technician may receive an alarm that a large web retailer is experiencing excessive web server latency. The computer technician may study the relevant computer KPIs for the web retailer to solve the web latency problem. The computer technician may then establish an automated computer response to the specific computer KPIs pertinent to these logical components. This manual approach to handling computer KPIs is not scalable for large cloud networks. Since computer technicians cannot manually handle the massive amount of computer KPIs, automated computer tools have been developed to process the KPIs.

Logical networks comprises nodes and edges that propagate data through various logical operations to produce output data. Although logical networks are used for various data mining processes, automated KPI computer tools do not effectively and efficiently use logical networking to detect computer performance anomalies.

TECHNICAL OVERVIEW

In an exemplary embodiment, a computer system hosts a logical Key Performance Indicator (KPI) network to detect computer performance anomalies. Databases execute database KPI nodes, database edges, and database instance nodes of the logical KPI network to propagate database KPI data to a KPI server system. Application servers execute application server KPI nodes, application server edges, and application server instance nodes of the logical KPI network to propagate application server KPI data to the KPI server system. Web servers execute web server KPI nodes, web server edges, and web server instance nodes of the logical KPI network to propagate web server KPI data to the KPI server system. This KPI data indicates logical data path information for the propagated KPI data (instead of KPI values). The KPI server system processes the logical data path information to indicate the computer performance anomalies.

DETAILED DESCRIPTION

Figure 1:
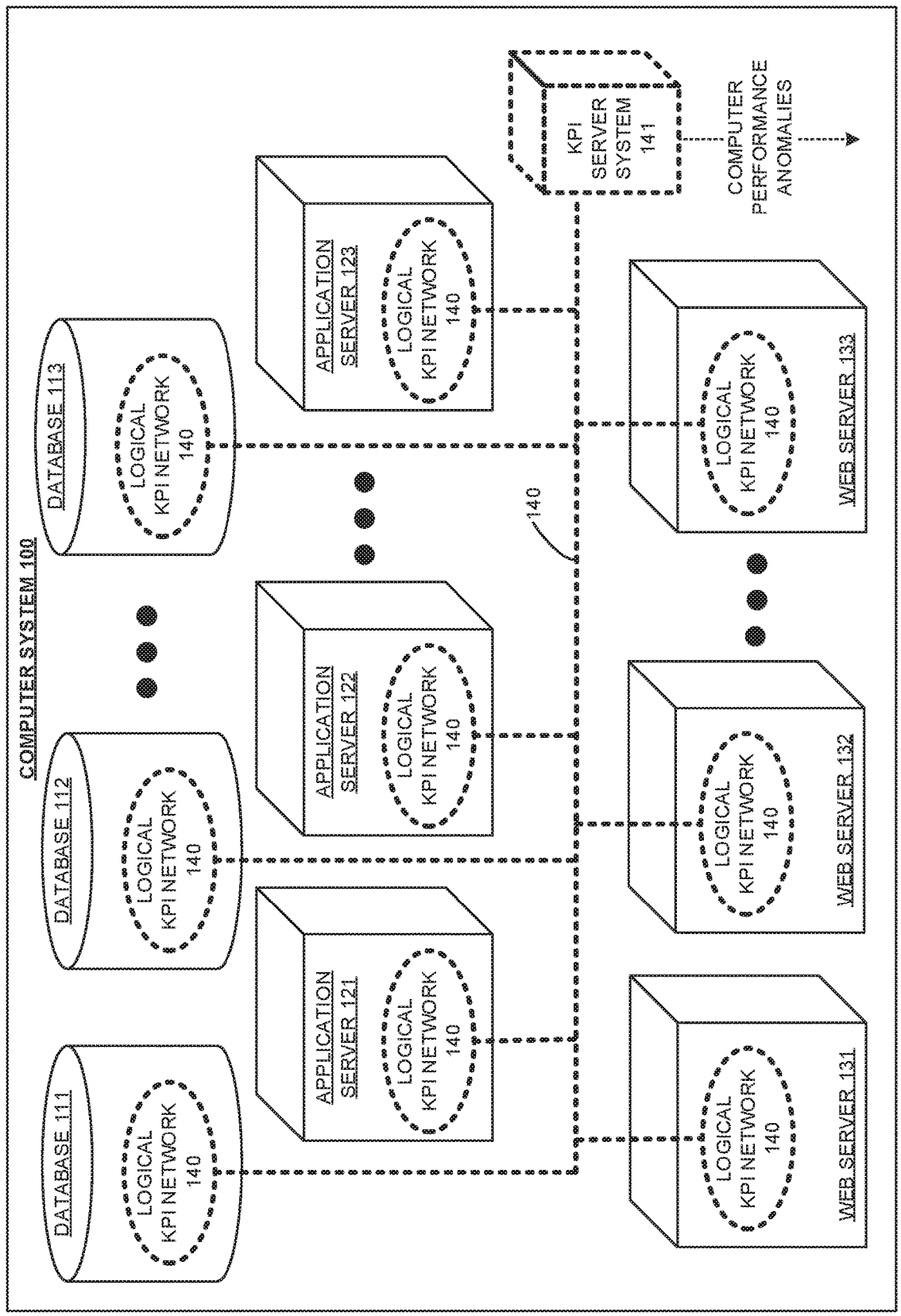
FIG. 1 illustrates a computer system to identify computer performance anomalies with a logical Key Performance Indicator (KPI) network in an exemplary embodiment although the computer system may vary in other embodiments.

FIG. 1 illustrates computer system 100 to identify computer performance anomalies with logical Key Performance Indicator (KPI) network 140 in an exemplary embodiment although the computer system may vary in other embodiments. KPIs comprise text statements that indicate computer system status. Exemplary KPIs include: microprocessor usage, memory usage, transceiver data rate, application status, session status, power status, environmental conditions, and the like. Computer performance anomalies comprise unhealthy computer conditions. Exemplary computer performance anomalies include web site latency, hanging user applications, logical memory overflow, or some other computer problem.

Computer system 100 comprises databases 111-113, application servers 121-123, web server 131-133, and KPI server 141. The number of databases and servers that are shown on FIG. 1 has been restricted for clarity. In a large global deployment, there would be a massive number of databases and servers to support a huge number of users. Advantageously, computer system 100 employs logical KPI network 140 to detect computer performance anomalies, and logical KPI network 140 is scalable from small deployments to large and complex global deployments.

Databases 111-113 host data for users like businesses, schools, hospitals, government agencies, or some other database customers. Databases 111-113 also host a database portion of logical KPI network 140 in a load-balanced manner. Databases 111-113 comprise computer equipment like Random Access Memory (RAM), flash drives, disk drives, tape drives, or some other memory circuitry. Databases 111-113 comprise database software like operating systems, communication protocols, and database applications.

Application servers 121-123 host applications for the users. The user applications may vary but typically include transaction modules, communication services, data analytics, collaboration platforms, and the like. Application servers 121-123 also host an application portion of logical KPI network 140 in a load-balanced manner. Application servers 121-123 comprise computer equipment like Central Processing Units (CPU), memory circuitry, Input/Output (I/O) transceivers, and bus circuitry. Application servers 121-123 comprise computer software like operating systems, communication protocols, and user applications.

Web servers 131-133 host web applications like business and government web sites. Web servers 121-123 also host a web portion of logical KPI network 140 in a load-balanced manner. Web servers 131-133 comprise computer equipment like CPU, memory circuitry, I/O transceivers, and bus circuitry. Web servers 131-133 comprise computer software like operating systems, communication protocols, and web applications.

KPI server system 141 hosts an anomaly portion of logical KPI network 140. KPI server system 141 receives KPI data from databases 111-113, application servers 121-123, and web servers 131-133. The anomaly portion of logical KPI network 140 in KPI server system 141 processes the KPI data to detect computer performance anomalies. KPI server system 141 comprises computer equipment like CPU circuitry, memory circuitry, I/O transceivers, and bus circuitry. KPI server system 141 comprises computer software like operating systems, communication protocols, and KPI applications.

Logical KPI network 140 comprises hardware and software in databases 111-113, application servers, 121-123, web servers 131-133, and KPI server 141. The software comprises logical KPI nodes and logical instance nodes that are interconnected by logical edges. The edges are typically acyclic. Logical KPI network 140 comprises data communication links that interconnect KPI server system 141 with logical network components in databases 111-113, application servers, 121-123, web servers 131-133.

Databases 111-113 generate database KPIs. For example, flash drives may report their percent utilization. The database KPIs may include database operating system KPIs. For example, a database operating system may report the status of an ethernet component and an internet component in its communication protocol stack. Databases 111-113 enter the database KPIs into the logical KPI nodes in logical KPI network 140. In response to the entered KPI data, the database KPI nodes, database edges, and database instance nodes of logical KPI network 140 propagate the database KPI data through logical KPI network 140 to KPI server system 141.

Application servers 121-123 generate application server KPIs. For example, server CPU cores may report their occupancy and cache fill. The application server KPIs may include application server operating system KPIs. For example, an application server operating system may report the application status like the number of active user sessions, hanging sessions, and the like. Application servers 111-113 enter the application server KPIs into the logical KPI nodes in logical KPI network 140. In response to the entered KPI data, the application server KPI nodes, application server edges, and application server instance nodes of logical KPI network 140 propagate the application server KPI data through logical KPI network 140 to KPI server system 141.

Web servers 131-133 generate web server KPIs. For example, a web server may report its I/O data rate and I/O memory fill. The web server KPIs may include web server operating system KPIs. For example, a web server operating system may report user session durations and data amounts. Web servers 131-133 enter the web server KPIs into the logical KPI nodes in logical KPI network 140. In response to the entered KPI data, the web server KPI nodes, web server edges, and web server instance nodes of logical KPI network 140 propagate the web server KPI data through logical KPI network 140 to KPI server system 141.

KPI server system 141 receives the database KPI data, the application server KPI data, and the web server KPI data. The received KPI data indicates the respective egress nodes, where an egress node is the last instance node in logical network 140 that sent the KPI data to KPI server system 141. In some examples, the received KPI data also indicates the logical data paths that were traversed by the KPI data through logical KPI network 140. The data paths may comprise the sequences of KPI nodes, edges, and instance nodes that indicate a KPI anomaly tree in logical network 140.

KPI server system 141 detects the computer performance anomalies based on the egress instance nodes. Note that a single instance node may indicate a specific computer performance anomaly and a combination of instance nodes could indicate another computer performance anomaly. For example, a computer performance anomaly may be detected when KPI data is received in KPI server system 141 from three discrete data paths through logical KPI network 140 with a given time period. Other algorithms could be used to detect computer performance anomalies.

Computer system 100 comprises computer hardware and software that is configured to improve the user computing experience by processing large amounts of KPIs to detect computer performance anomalies. The computer hardware comprises processing circuitry like CPUs, Digital signal Processors (DSPs), Graphical Processing Units (GPUs), I/O transceivers, bus circuitry, and memory circuitry. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like Control Units (CUs), Logic Units (LUs), and Random Access Memory (RAM). In turn, the CUs, LUs, and RAM are metallically connected to form CPUs, DSPs, GPUs, transceivers, bus circuitry, and memory.

In the computer hardware, the CUs drive data between the RAM and the LUs, and the LUs operate on the data. The CUs also drive interactions with external memory like flash drives, disk drives, and the like. The computer hardware executes machine-level software to control and move data by driving machine-level inputs like voltages and currents to the CUs, LUs, and RAM. The machine-level software is typically compiled from higher-level software programs. The higher-level software programs comprise operating systems, utilities, applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control.

Figure 2:
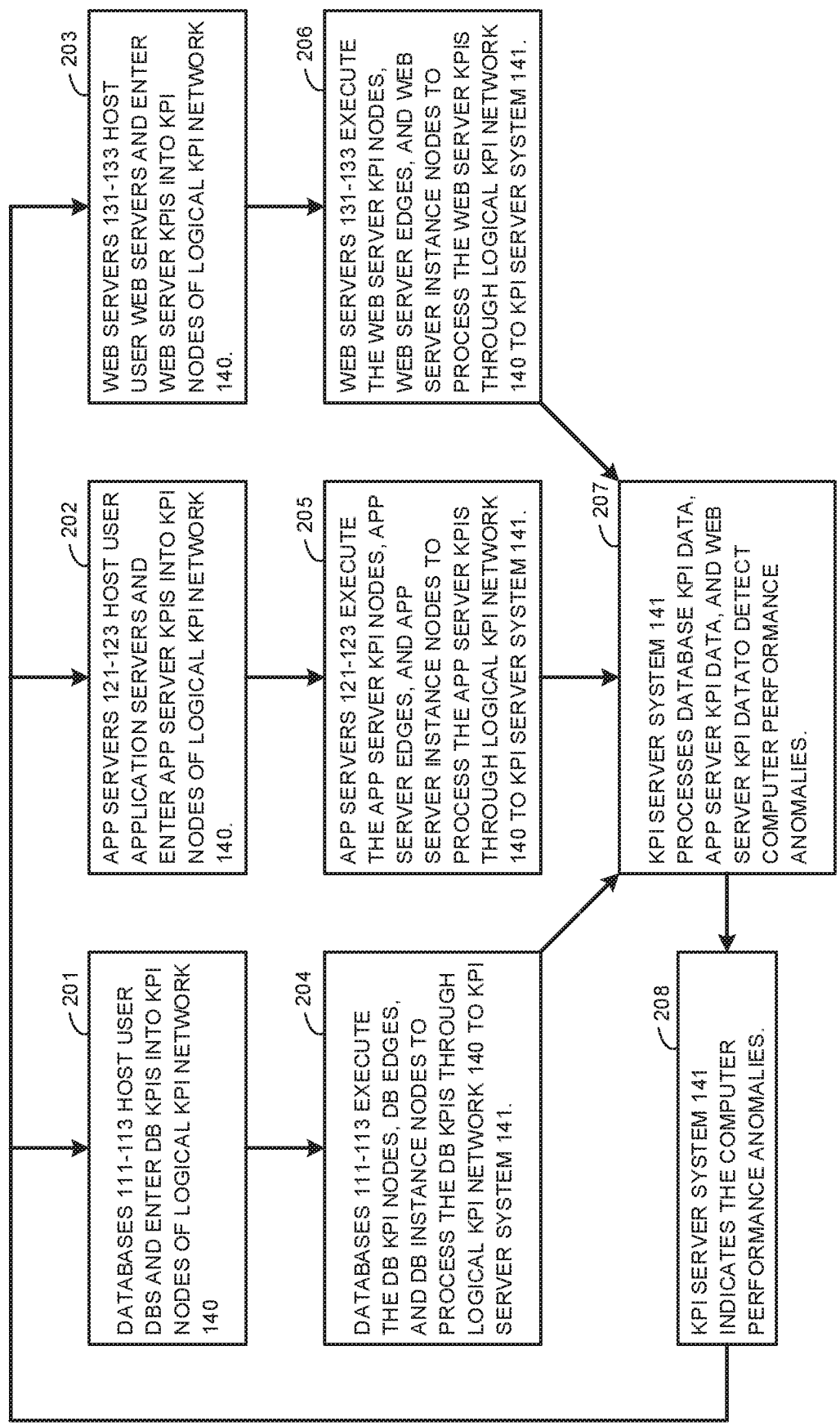
FIG. 2 illustrates the operation of the computer system to identify the computer performance anomalies with the logical KPI network in an exemplary embodiment although the operation may vary in other embodiments.

FIG. 2 illustrates the operation of computer system 100 to identify the computer performance anomalies with logical KPI network 140 in an exemplary embodiment although the operation may vary in other embodiments. Databases 111-113 host user data databases and enter database KPIs into logical KPI nodes in logical KPI network 140 (201). Application servers 121-123 host user applications and enter the application server KPIs into logical KPI nodes in logical KPI network 140 (202). Web servers 131-133 host user web sites and enter web server KPIs into logical KPI nodes in logical KPI network 140 (203).

Databases 111-113 execute the logical database KPI nodes, database edges, and database instance nodes of logical KPI network 140 to propagate the database KPI data through logical KPI network 140 to KPI server system 141 (204). Application servers 121-123 execute the logical application server KPI nodes, application server edges, and application server instance nodes of logical KPI network 140 to propagate the application server KPI data through logical KPI network 140 to KPI server system 141 (205). Web servers 131-133 execute the logical web server KPI nodes, web server edges, and web server instance nodes of logical KPI network 140 to propagate the web server KPI data through logical KPI network 140 to KPI server system 141 (206).

KPI server system 141 processes the database KPI data, the application server KPI data, and the web server KPI data to detect computer performance anomalies (207). Typically, KPI server system 141 identifies the egress nodes or logical paths in logical network 140 that sent the KPI data to KPI server system 141 and detects the computer performance anomalies based on these egress nodes/logical paths or combinations of egress nodes/logical paths. KPI server system 141 transfers data that indicates the detected computer performance anomalies (208). The operation then repeats (201, 202, 203).

Figure 3:
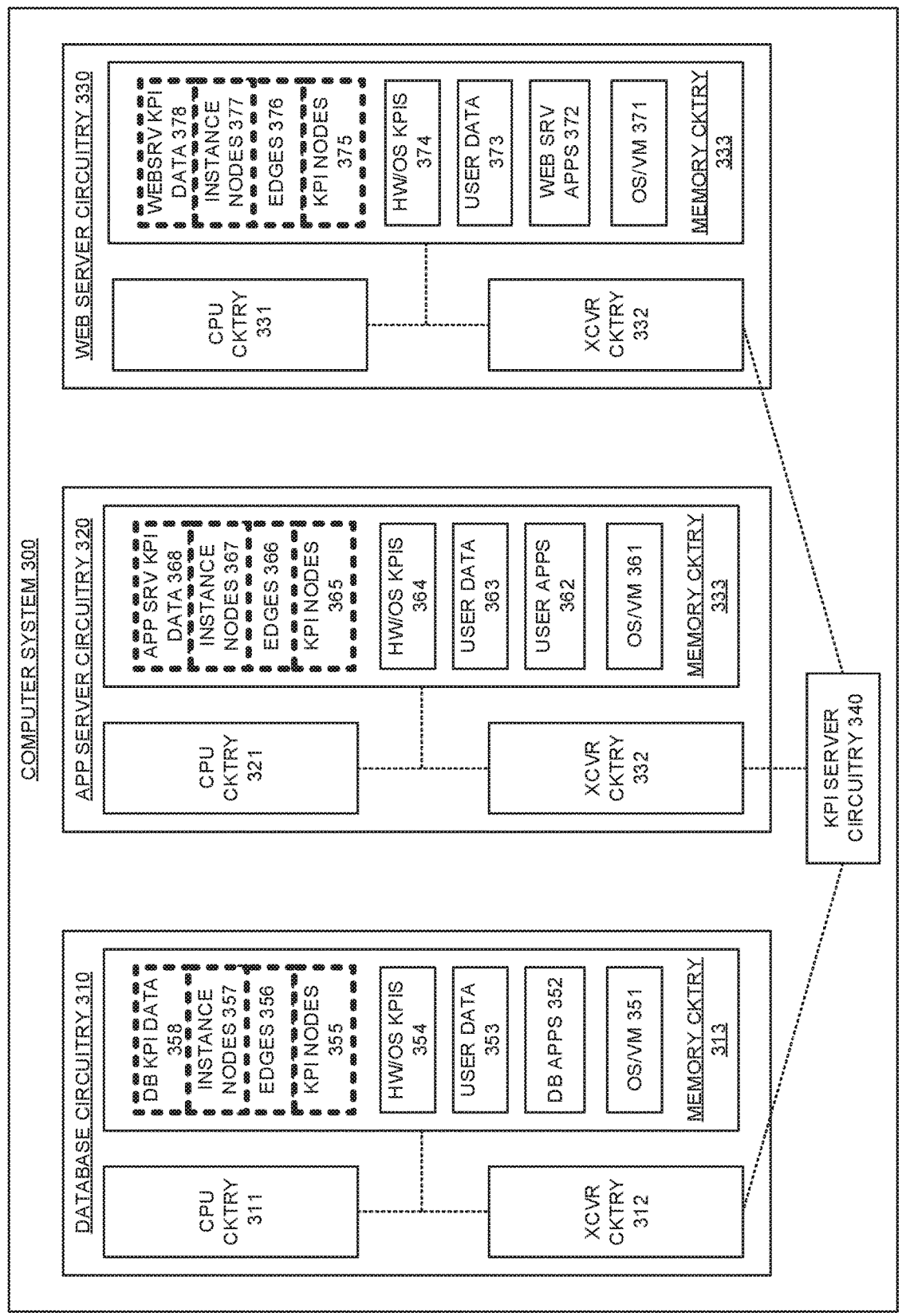
FIG. 3 illustrates computer circuitry to identify the computer performance anomalies with the logical KPI network in an exemplary embodiment although the computer circuitry may vary in other embodiments.

FIG. 3 illustrates computer system 300 having circuitry to identify computer performance anomalies with a logical KPI network in an exemplary embodiment although the computer system may vary in other embodiments. Computer system 300 comprises database circuitry 310, application server circuitry 320, web server circuitry 330, and KPI server circuitry 340. Database circuitry 310 comprises CPU circuitry 311, transceiver (XCVR) circuitry 312, and memory circuitry 313. Memory circuitry 313 stores Operating System/Virtual Machines (OS/VM) 351, database applications 352, user data 353, Hardware/Operating System (HW/OS) KPIs 354, logical KPI nodes 355, logical edges 356, logical instance nodes 357, and database KPI data 358. Logical KPI nodes 355, edges 356, instance nodes 357, and data 358 form the database portion of the logical KPI network.

Application server circuitry 320 comprises CPU circuitry 321, transceiver circuitry 322, and memory circuitry 323. Memory circuitry 323 stores OS/VM 361, user applications 362, user data 363, HW/OS KPIs 364, logical KPI nodes 365, logical edges 366, logical instance nodes 367, and app server (SRV) KPI data 368. Logical KPI nodes 365, edges 366, instance nodes 367, and data 368 form the application server portion of the logical KPI network.

Web server circuitry 330 comprises CPU circuitry 331, transceiver circuitry 332, and memory circuitry 333. Memory circuitry 333 stores OS/VM 371, user applications 372, user data 373, HW/OS KPIs 374, logical KPI nodes 375, logical edges 376, logical instance nodes 377, and web server KPI data 378. Logical KPI nodes 375, edges 376, instance nodes 377, and data 368 form the web server portion of the logical KPI network.

In database circuitry 310, CPU circuitry 311 executes OS/VM 351 to host database applications 352 and corresponding user data 353. CPU circuitry 311 also executes OS/VM 351 and database applications 352 and to generate HW/OS KPIs 354. CPU circuitry 311 executes KPI nodes 355 to intake and forward HW/OS KPIs 354 to logical edges 356 per KPI routing maps. Logical edges 356 and logical instance nodes 357 process and exchange KPI data within the logical KPI network per KPI route maps. Logical instance nodes 357 eventually produce database KPI data 358 that indicates the specifically-traversed KPI nodes 355, edges 356, and instance nodes 357. Egress logical instance nodes 357 call OS/VM 351 (both executing in CPU circuitry 311) to direct transceiver circuitry 312 to transfer database KPI data 358 from memory circuitry 313 to KPI server circuitry 340.

In application server circuitry 320, CPU circuitry 321 executes OS/VM 361 to host user applications 362 and corresponding user data 363. CPU circuitry 321 also executes OS/VM 361 and user applications 362 to generate HW/OS KPIs 364. CPU circuitry 321 executes KPI nodes 365 to intake and forward HW/OS KPIs 364 to logical edges 366 per a KPI route map. Logical edges 366 and logical instance nodes 367 process and exchange KPI data within the logical KPI network per a KPI route map. Logical instance nodes 367 eventually produce application server KPI data 368 that indicates the specifically-traversed KPI nodes 365, edges 366, and instance nodes 367. Egress logical instance nodes 367 call OS/VM 361 (both executing in CPU circuitry 321) to direct transceiver circuitry 322 to transfer database KPI data 368 from memory circuitry 323 to KPI server circuitry 340.

In web server circuitry 330, CPU circuitry 331 executes OS/VM 371 to host user applications 372 and corresponding user data 373. CPU circuitry 331 also executes OS/VM 371 and user applications 372 to generate HW/OS KPIs 374. CPU circuitry 371 executes KPI nodes 375 to intake and forward HW/OS KPIs 374 to logical edges 376 per a KPI route map. Logical edges 376 and logical instance nodes 377 process and exchange KPI data within the logical KPI network per a KPI route map. Logical instance nodes 377 eventually produce web server KPI data 378 that indicates the specifically-traversed KPI nodes 375, edges 376, and instance nodes 377. Egress logical instance nodes 377 call OS/VM 371 (both executing in CPU circuitry 331) to direct transceiver circuitry 332 to transfer database KPI data 378 from memory circuitry 333 to KPI server circuitry 340.

Figure 4:
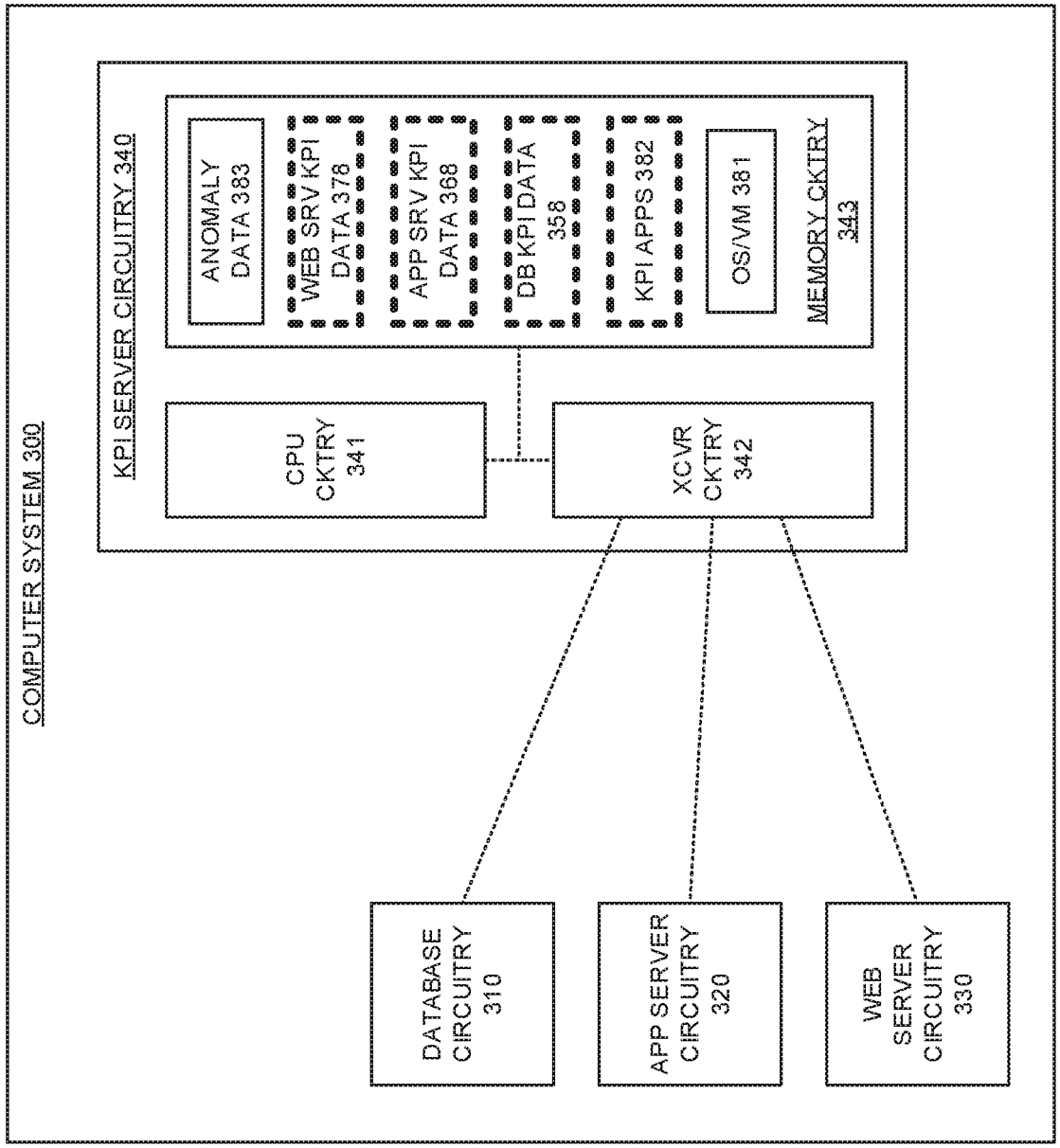
FIG. 4 illustrates computer circuitry to identify the computer performance anomalies with the logical KPI network in an exemplary embodiment although the computer circuitry may vary in other embodiments.

FIG. 4 illustrates computer system 300 to identify computer performance anomalies with a logical KPI network in an exemplary embodiment although the computer system may vary in other embodiments. Computer system 300 comprises database circuitry 310, application server circuitry 320, web server circuitry 330, and KPI server circuitry 340. KPI server circuitry 340 comprises CPU circuitry 341, transceiver circuitry 342, and memory circuitry 343. Memory circuitry 343 stores OS/VM 381, KPI applications 382, database KPI data 358, application server KPI data 368, web server KPI data 378, and anomaly data 383. KPI applications 382, database KPI data 358, application server KPI data 368, and web server KPI data 378 form the anomaly portion of the logical KPI network.

KPI server circuitry 340 stores anomaly data that associates specific logical data paths (or combinations of logical data paths) with specific computer performance anomalies. In KPI server circuitry 340, CPU circuitry 341 executes OS/VM 381 to host KPI applications 382 and process KPI data 358, 368, and 378. KPI applications 382 process KPI data 358, 368, and 378 to detect computer performance anomalies based on the logical data paths that propagate KPI data 358, 368, and 378. CPU circuitry 341 executes KPI applications 382 to generate anomaly data 383 that indicates the detected computer performance anomalies and metadata. KPI applications 382 call OS/VM 381 (both executing in CPU circuitry 341) to direct transceiver circuitry 342 to transfer anomaly data 383 from memory circuitry 343 to various data systems.

Referring to both FIGS. 3 and 4, CPU circuitry 311, 321, 331, and 341 comprise circuit boards, integrated microprocessors, cache memory, RAM, and associated electronics. transceiver circuitry 312, 322, 332, and 342 comprises communication equipment, such as ports, bus interfaces, signal processors, memory, software, and the like. Memory circuitry 313, 323, 333, and 343 comprises non-transitory, machine-readable, data storage media, such as flash drives, disc drives, and the like. All or portions of the software components may be externally stored on one or more storage media, such as circuitry, discs, flash memory, and the like. Some conventional aspects of circuitry 310, 320, 330, and 340 are omitted for clarity, such as power supplies and enclosures.

Figure 5:
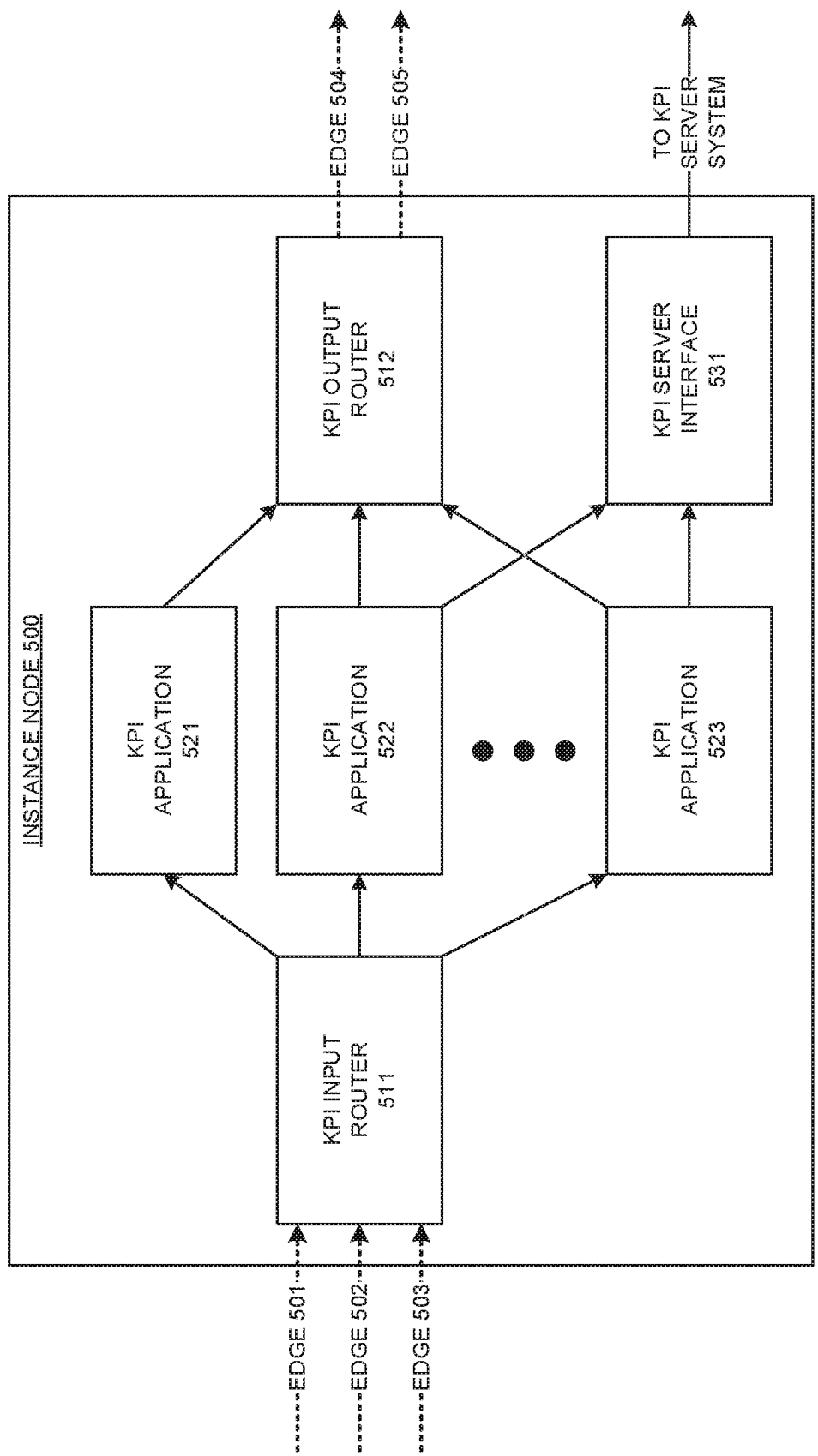
FIG. 5 illustrates an instance node in a logical KPI network to identify computer performance anomalies exemplary embodiment although the instance nodes may vary in other embodiments.

FIG. 5 illustrates logical instance node 500 for a logical KPI network to identify computer performance anomalies in an exemplary embodiment although the instance node may vary in other embodiments. Logical instance node 500 comprises KPI routers 511-512, KPI applications 521-523, and KPI server interface 531. KPI routers 511-512, KPI applications 521-523, and KPI server interface 531 comprise software applications that are stored in memory and executed in circuitry. KPI input router 511 is logically coupled to logical network edges 501-503 which are logically coupled to KPI intake nodes and/or other instance nodes. KPI output router 512 is logically coupled to logical network edges 504-505 which are logically coupled to other instance nodes. KPI server interface 531 is coupled to a KPI server system that performs anomaly detection. KPI applications 521-523 are logically coupled between KPI routers 511-512. KPI applications 521-523 perform various data tasks such as summing, averaging, normalizing, threshold comparisons, data routing and the like. Note that KPI applications 522-523 are logically coupled to the KPI server system over KPI server interface 531, so instance node 500 is an egress node that is coupled to the KPI server system.

KPI input router 511 receives and distributes KPI data from edges 501-503 to KPI applications 521-523 per a route map. KPI applications 521-523 process the KPI data and perform various data tasks. For example, KPI application 521 may average and normalize CPU usage data from edges 501-503, and if the average CPU usage exceeds a threshold, then KPI application 521 transfers KPI data indicating excessive CPU usage to other instance nodes over edge 504. In another example, KPI application 522 may normalize and score the amount of hung user sessions and the amount of available memory, and if the score exceeds a threshold, then KPI application 522 transfers KPI data indicating the hung session/memory status to KPI server system over KPI server interface 531.

Figure 6:
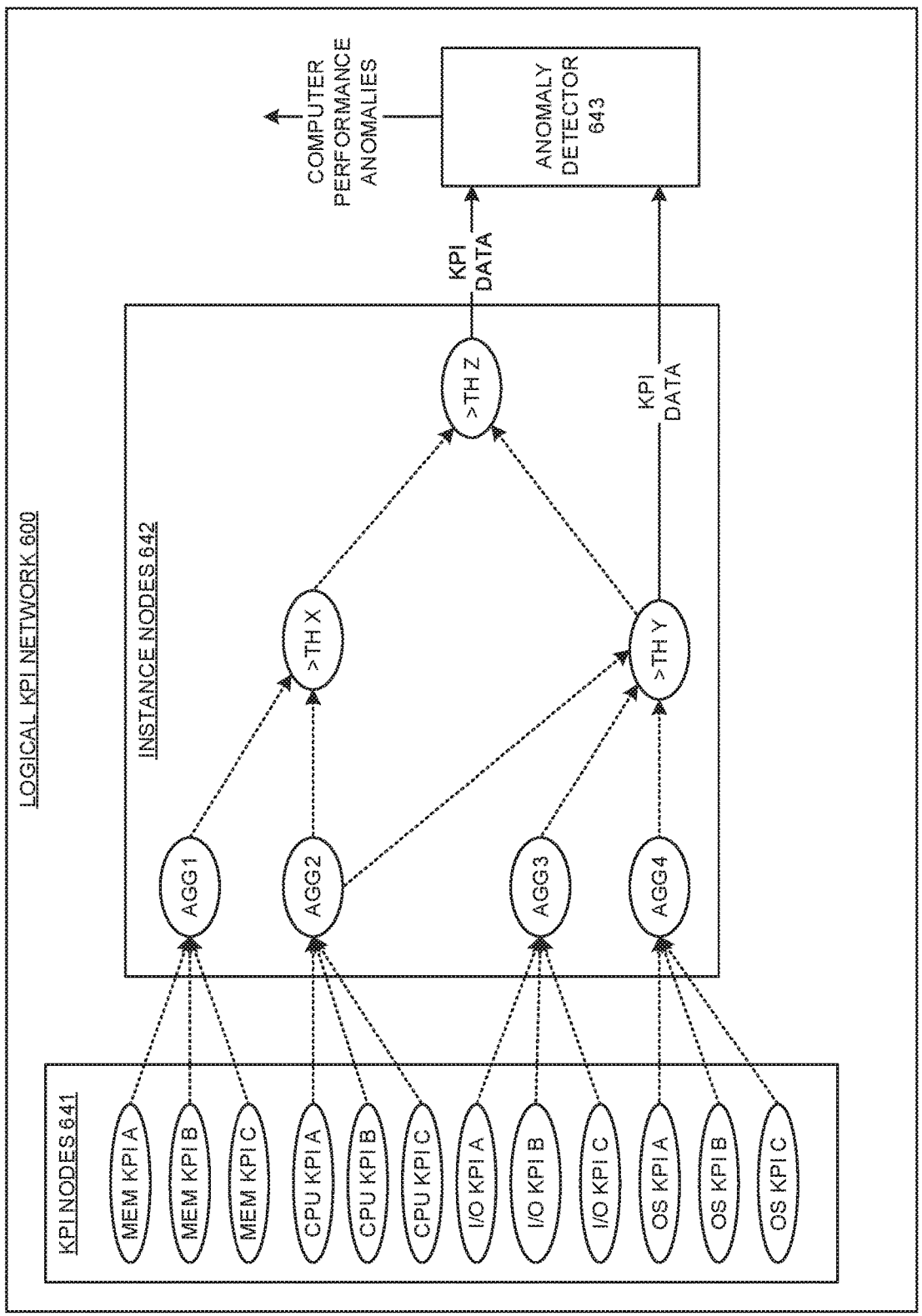
FIG. 6 illustrates a logical KPI network to identify computer performance anomalies in an exemplary embodiment although the logical KPI network may vary in other embodiments.

FIG. 6 illustrates logical KPI network 600 to identify computer performance anomalies in an exemplary embodiment although the logical KPI network may vary in other embodiments. Logical KPI network 600 comprises KPI nodes 641, instance nodes 642, and anomaly detector 643. KPI nodes 641 have been simplified for clarity. KPI nodes 641 intake and distribute memory KPIs, CPU KPIs, I/O KPIs, and OS KPIs per a KPI route map for each KPI node. KPI nodes 641 also format the KPIs to remove and mask insignificant data.

Instance nodes 642 have also been simplified for clarity. Instance nodes 642 process the KPI data from KPI nodes 641 with various internal applications. In this simplified example, four aggregation (AGG) instance nodes receive the KPIs from KPI nodes 641. The aggregation instance nodes typically count, sum, average, normalize, and transfer various KPIs related to CPUs, memory, transceivers, OSs, VMs, communication services, user applications, and the like. Three threshold comparison (>TH) instance nodes receive KPI data from the aggregation instance nodes. The threshold comparison instance nodes typically compare inputs from multiple sources to thresholds and transfer KPI data when a threshold is breached—possibly a specific number of times. Note that KPI values enter logical KPI network 600 but are converted into data path information and threshold breach counts.

Threshold comparison instance nodes ">TH Y" and ">TH Z" are egress instance nodes that directly feed KPI data to anomaly detector 643. When threshold Z is exceeded, the threshold comparison instance node TH>Z transfers KPI data to anomaly detector 643 that indicates egress instance node TH>Z and its source data path. When threshold Y is exceeded, the threshold comparison instance node TH>Y transfers KPI data to anomaly detector 643 that indicates egress instance node TH>Y and its source data path. These instance nodes may maintain KPI data counts and trigger only when a specific KPI exceeds a threshold more than a specified amount of times.

Anomaly detector 643 receives KPI data that indicates various egress instance nodes, logical data paths, and possibly counts. Anomaly detector 643 hosts anomaly data that associates egress instance nodes, logical data paths, and time frames with computer performance anomalies. For example, if anomaly detector 643 receives KPI data from instance node THZ, then anomaly detector 643 indicates the corresponding computer performance anomaly for instance node THZ. In another example, anomaly detector 643 contemporaneously receives KPI data that indicates instance nodes THY and THZ, so anomaly detector 643 indicates the corresponding computer performance anomaly for the combination of instance nodes THY and THZ.

Figure 7:
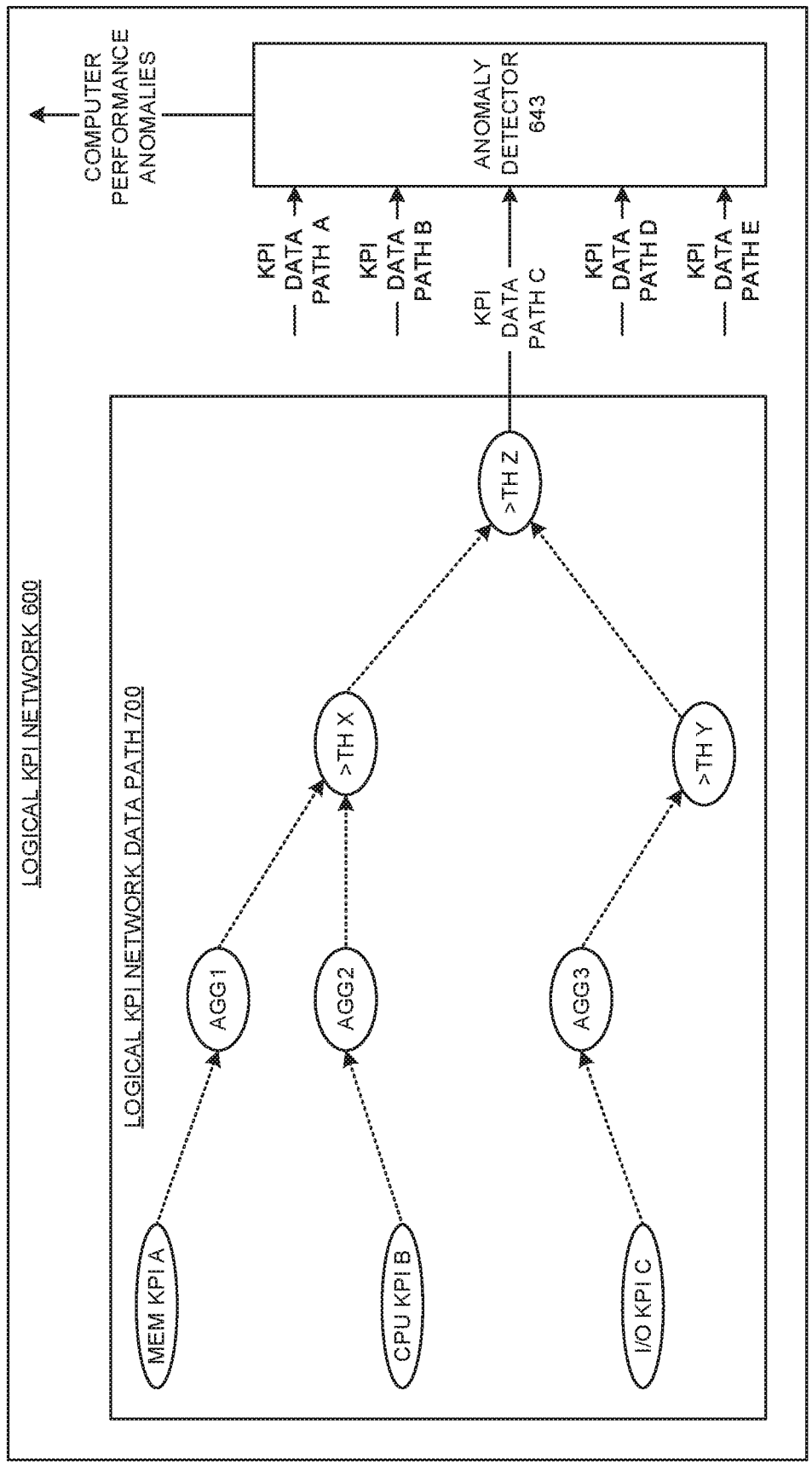
FIG. 7 illustrates a logical KPI network data path to identify computer performance anomalies in an exemplary embodiment although the logical KPI network data path may vary in other embodiments.

FIG. 7 illustrates logical KPI network 600 to identify computer performance anomalies in an exemplary embodiment although the logical KPI network may vary in other embodiments. Logical KPI network data path 700 is shown within logical KPI network 600 and is referred to as "KPI DATA PATH C" at anomaly detector 643. Logical KPI network data path 700 could be represented with the data string: "THZ (THY/AGG3/IO KPI C, THX (AGG2/CPU KPI B, AGG1/MEM KPI A)).

Anomaly detector 643 receives KPI data that indicates KPI data paths A-E for the propagated KPI data that reaches anomaly detector 643. Anomaly detector 643 hosts anomaly data that associates these data paths with computer performance anomalies. Anomaly detector 643 may hosts anomaly data that associates combinations of data paths with specific computer performance anomalies. For example, if anomaly detector 643 receives KPI data paths A, C, and E within 5 seconds of each other, then anomaly detector 643 indicates the corresponding computer performance anomaly. In another example, anomaly detector 643 may receive all five KPI data paths A-E within 5 minutes of each other and responsively indicate the corresponding computer performance anomaly.

The above description and associated drawings teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a computer system that hosts a logical Key Performance Indicator (KPI) network to detect computer performance anomalies for the computer system, the method comprising:
   entering, by database servers, database KPIs into database KPI nodes;
   executing, by the database servers, the database KPI nodes, database acyclic edges, and database instance nodes to propagate database KPI data through the logical KPI network to a KPI server system, the executing comprising:
      intaking and forwarding the database KPIs to the database instance nodes via the database acyclic edges based on routing maps of the logical KPI network; and
      processing, by the database instance nodes, the database KPIs to generate the database KPI data, wherein the logical KPI network comprises KPI network software comprising the database KPI nodes, the database instance nodes, and the database acyclic edges;
   entering, by application servers, application server KPIs into application server KPI nodes;
   executing, by the application servers, the application server KPI nodes, application server acyclic edges, and application server instance nodes to propagate application server KPI data through the logical KPI network to the KPI server system, the executing comprising:
      intaking and forwarding the application server KPIs to the application server instance nodes via the application server acyclic edges based on the routing maps; and
      processing, by the application server instance nodes, the application server KPIs to generate the application server KPI data, wherein the KPI network software comprises the application server KPI nodes, the application server instance nodes, and the application server acyclic edges;
   entering, by web servers, web server KPIs into web server KPI nodes;
   executing, by the web servers, the web server KPI nodes, web server acyclic edges, and web server instance nodes to propagate web server KPI data through the logical KPI network to the KPI server system, the executing comprising:
      intaking and forwarding the web server KPIs to the web server instance nodes via the web server acyclic edges based on the routing maps; and
      processing, by the web server instance nodes, the web server KPIs to generate the web server KPI data, wherein the KPI network software comprises the web server KPI nodes, the web server instance nodes, and the web server acyclic edges;
   processing, by the KPI server system, the database KPI data, the application server KPI data, and the web server KPI data to, in part, identify logical data path information; and
   detecting and indicating the computer performance anomalies based at least in part on the logical data path information.

2. The method of claim 1 wherein the processing the database KPIs comprises indicating an egress one of the database instance nodes for the database KPI data.

3. The method of claim 1 wherein the processing the application server KPIs comprises indicating an egress one of the application server instance nodes for the application server KPI data.

4. The method of claim 1 wherein the processing the web server KPIs comprises indicating an egress one of the web server instance nodes for the web server KPI data.

5. The method of claim 1 wherein the processing the database KPIs comprises indicating logical paths traversed by the database KPI data through the logical KPI network to the KPI server system.

6. The method of claim 1 wherein the processing the application server KPIs comprises indicating logical paths traversed by the web server KPI data through the logical KPI network to the KPI server system.

7. The method of claim 1 wherein the processing the web server KPIs comprises indicating logical paths traversed by the web server KPI data through the logical KPI network to the KPI server system.

8. A computer system to host a logical Key Performance Indicator (KPI) network to detect computer performance anomalies for the computer system, the computer system comprising:
   database servers configured to:
      enter database KPIs into database KPI nodes of the logical KPI network, and
      in response, execute the database KPI nodes, database acyclic edges, and database instance nodes to propagate database KPI data through the logical KPI network to a KPI server system, the executing comprising:
         intaking and forwarding the database KPIs to the database instance nodes via the database acyclic edges based on routing maps of the logical KPI network; and
         processing, by the database instance nodes, the database KPIs to generate the database KPI data, wherein the logical KPI network comprises KPI network software comprising the database KPI nodes, the database instance nodes, and the database acyclic edges;
   application servers configured to:
      enter application server KPIs into application server KPI nodes of the logical KPI network, and
      in response, execute the application server KPI nodes, application server acyclic edges, and application server instance nodes to propagate application server KPI data through the logical KPI network to the KPI server system, the executing comprising:
         intaking and forwarding the application server KPIs to the application server instance nodes via the application server acyclic edges based on the routing maps; and
         processing, by the application server instance nodes, the application server KPIs to generate the application server KPI data, wherein the KPI network software comprises the application server KPI nodes, the application server instance nodes, and the application server acyclic edges;

web servers configured to:
  enter web server KPIs into web server KPI nodes of the logical KPI network, and
  in response, execute the web server KPI nodes, web server acyclic edges, and web server instance nodes to propagate web server KPI data through the logical KPI network to the KPI server system, the executing comprising:
    intaking and forwarding the web server KPIs to the web server instance nodes via the web server acyclic edges based on the routing maps; and
    processing, by the web server instance nodes, the web server KPIs to generate the web server KPI data, wherein the KPI network software comprises the web server KPI nodes, the web server instance nodes, and the web server acyclic edges; and the KPI server system configured to:
  process the database KPI data, the application server KPI data, and the web server KPI data to, in part, identify logical data path information; and
  responsively detect and indicate the computer performance anomalies based at least in part on the logical data path information.

9. The computer system of claim 8 wherein the database servers are configured to indicate an egress one of the database instance nodes for the database KPI data.

10. The computer system of claim 8 wherein the application servers are configured to indicate an egress one of the application server instance nodes for the application server KPI data.

11. The computer system of claim 8 wherein the web servers are configured to indicate an egress one of the web server instance nodes for the web server KPI data.

12. The computer system of claim 8 wherein the database servers are configured to indicate logical paths traversed by the database KPI data through the logical KPI network to the KPI server system.

13. The computer system of claim 8 wherein the application servers are configured to indicate logical paths traversed by the web server KPI data through the logical KPI network to the KPI server system.

14. The computer system of claim 8 wherein the web servers are configured to indicate logical paths traversed by the web server KPI data through the logical KPI network to the KPI server system.

15. A computer apparatus to host a logical Key Performance Indicator (KPI) network to detect computer performance anomalies for the computer apparatus, the computer apparatus comprising:
  computer data storage configured to store KPI processing instructions;
  the KPI processing instructions configured to direct computer circuitry to:
    enter database KPIs into database KPI nodes of the logical KPI network;
    in response, execute the database KPI nodes, database acyclic edges, and database instance nodes to propagate database KPI data through the logical KPI network to a KPI server system, the executing comprising:
      intaking and forwarding the database KPIs to the database instance nodes via the database acyclic edges based on routing maps of the logical KPI network; and
      processing, by the database instance nodes, the database KPIs to generate the database KPI data, wherein the logical KPI network comprises KPI network software comprising the database KPI nodes, the database instance nodes, and the database acyclic edges;
    enter application server KPIs into application server KPI nodes of the logical KPI network;
    in response, execute the application server KPI nodes, application server acyclic edges, and application server instance nodes to propagate application server KPI data through the logical KPI network to the KPI server system, the executing comprising:
      intaking and forwarding the application server KPIs to the application server instance nodes via the application server acyclic edges based on the routing maps; and
      processing, by the application server instance nodes, the application server KPIs to generate the application server KPI data, wherein the KPI network software comprises the application server KPI nodes, the application server instance nodes, and the application server acyclic edges;
    enter web server KPIs into web server KPI nodes of the logical KPI network;
    in response, execute the web server KPI nodes, web server acyclic edges, and web server instance nodes to propagate web server KPI data through the logical KPI network to the KPI server system, the executing comprising:
      intaking and forwarding the web server KPIs to the web server instance nodes via the web server acyclic edges based on the routing maps; and
      processing, by the web server instance nodes, the web server KPIs to generate the web server KPI data, wherein the KPI network software comprises the web server KPI nodes, the web server instance nodes, and the web server acyclic edges;
    process the database KPI data, the application server KPI data, and the web server KPI data to, in part, identify logical data path information; and
  responsively detect and indicate the computer performance anomalies based at least in part on the logical data path information.

16. The computer apparatus of claim 15 wherein the KPI processing instructions are configured to direct the computer circuitry to indicate an egress one of the database instance nodes for the database KPI data.

17. The computer apparatus of claim 15 wherein the KPI processing instructions are configured to direct the computer circuitry to indicate an egress one of the application server instance nodes for the application server KPI data.

18. The computer apparatus of claim 15 wherein the KPI processing instructions are configured to direct the computer circuitry to indicate an egress one of the web server instance nodes for the web server KPI data.

19. The computer apparatus of claim 15 wherein the KPI processing instructions are configured to direct the computer circuitry to indicate logical paths traversed by the database KPI data through the logical KPI network to the KPI server system.

20. The computer apparatus of claim 15 wherein the KPI processing instructions are configured to direct the computer circuitry to indicate logical paths traversed by the application server KPI data through the logical KPI network to the KPI server system and to indicate logical paths traversed by the web server KPI data through the logical KPI network to the KPI server system.

* * * * *